J. B. GOTT.
CONTROLLING DEVICE FOR WINDING MACHINERY.
APPLICATION FILED MAR. 25, 1912.

1,045,090.

Patented Nov. 19, 1912.
2 SHEETS—SHEET 1.

J. B. GOTT.
CONTROLLING DEVICE FOR WINDING MACHINERY.
APPLICATION FILED MAR. 25, 1912.

1,045,090.

Patented Nov. 19, 1912.

2 SHEETS—SHEET 2.

Witnesses
Hubert A. Gill
Charles E. Pover

Inventor
J. B. Gott
per his atty
W. P. Thompson

UNITED STATES PATENT OFFICE.

JOSEPH BARRACLOUGH GOTT, OF CHESTER, ENGLAND, ASSIGNOR TO SANDYCROFT FOUNDRY COMPANY LIMITED, OF SANDYCROFT, ENGLAND.

CONTROLLING DEVICE FOR WINDING MACHINERY.

1,045,090.  Specification of Letters Patent.  Patented Nov. 19, 1912.

Application filed March 25, 1912. Serial No. 686,070.

*To all whom it may concern:*

Be it known that I, JOSEPH BARRACLOUGH GOTT, a subject of the King of Great Britain, residing at Chester, in the county of Chester, in the Kingdom of England, have invented certain new and useful Improvements in Controlling Devices for Winding Machinery, of which the following is a specification.

This invention relates to controlling devices for use with winding machinery, for the purpose of preventing overwinding or running at excessive speeds, or starting in the wrong direction.

It is the object of the invention to provide an improved apparatus of this type which will be certain in action and simple in construction.

In carrying the invention into effect notched or toothed engaging members are used mounted by means of collars on screw threaded shafts, nuts being arranged to be traversed longitudinally by the screws as these are rotated at a speed proportional to the speed of winding. The nuts according to this invention are guided so as to have a small amount of turning movement whereby one of them is allowed to come into action while the other is out of action according to the direction of winding. Adjustable stops are provided for insuring the desired reduction of speed before the end of the wind. The sleeve of one of the notched plates is struck by one of the nuts in case of winding being started in the wrong direction. In every case in which one of the nuts engages one of the toothed plates or the adjustable stop thereon, or one of the sleeves thereof, a releasing device is actuated by means of which the desired control of the winding is effected. The nuts indicate the positions of the lift cages during the winding as is usual, but the positions are shown more clearly just at the ends of the winds by pointers actuated by the nuts.

The invention will be described with reference to the accompanying drawings which illustrate by way of example one construction according to the invention.

Figure 1:
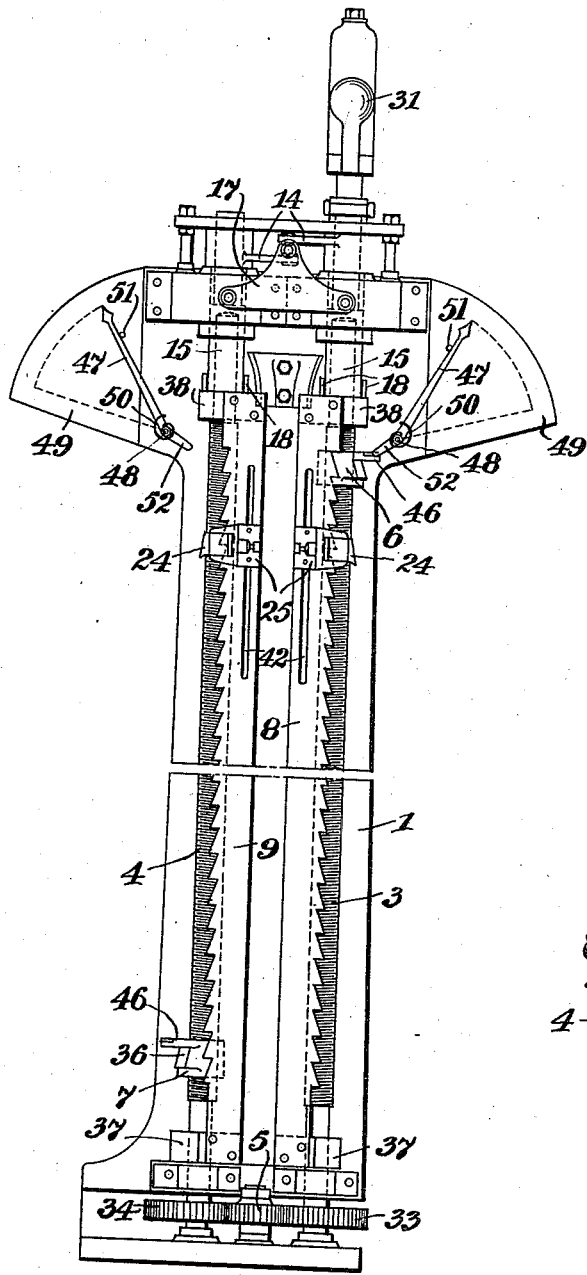
Figure 2:
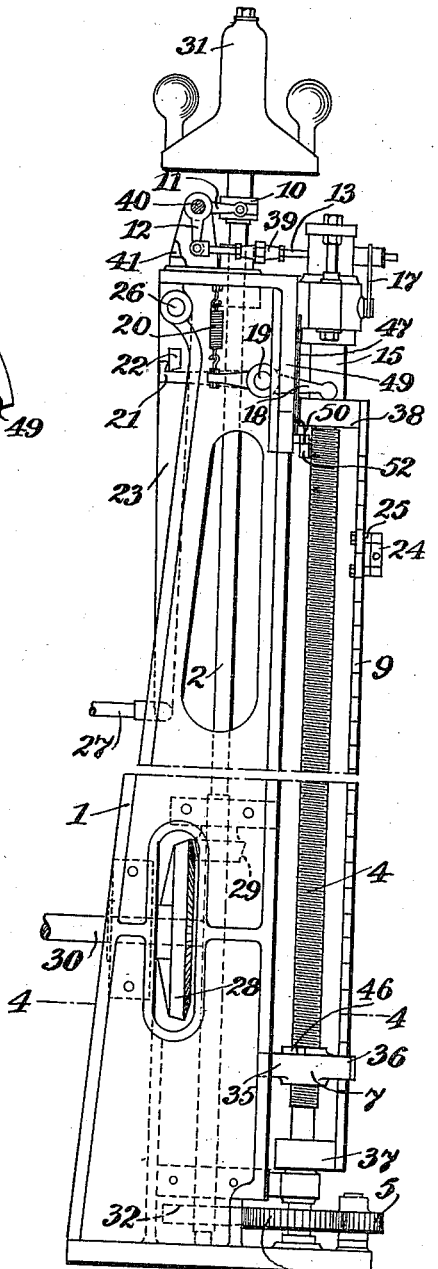
Figure 3:
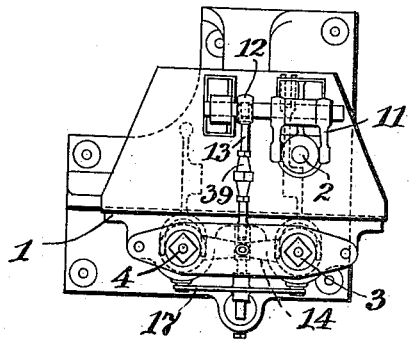
Figure 4:
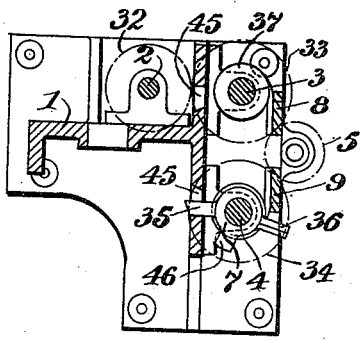

In the drawings:—Figure 1 is a front elevation of the apparatus; Fig. 2 is a side elevation thereof; Fig. 3 is a plan view thereof, the governor being omitted or removed; and Fig. 4 is a sectional plan taken on the line 4—4 of Fig. 2.

Referring to the drawings, a vertical frame or stand 1 carries a governor shaft 2 which may be supported at the bottom in a suitable foot-step bearing. The shaft 2 is driven through a pair of bevel wheels 28, 29, the latter being on the shaft 2, while the former is on a shaft 30 driven from the winding machinery. Hence the speed of rotation of the shaft 2 corresponds with the speed of the winding. A governor 31 of any convenient type is mounted on the top of the shaft 2 as shown. The shaft 2 carries a gear wheel 32 at the bottom, shown in dotted lines in Fig. 2, and meshing with the gear wheel 33 which in turn meshes with an idle pinion 5 which drives another gear wheel 34. The gear wheels 33 and 34 are fixed on the lower ends of screwed shafts 3 and 4 which are supported in a vertical position as shown in the frame 1. The screwed shafts 3 and 4 are oppositely threaded, one having a right hand thread, and the other a left hand thread, and they rotate in the same direction of rotation. On the shafts 3 and 4 work nuts 6 and 7 respectively. Each of these nuts has three projections, the rear projection 35 being arranged to work in a slot 45 in the frame 1, as seen in Fig. 4, while the lateral projection 46 serves a purpose hereinafter stated, and the forward projection 36 of each nut is shaped as seen in Figs. 1 and 2, to correspond with the teeth of ratchet plates 8 and 9 which coöperate with the nuts as described below. Each of these ratchet plates is supported at the bottom by a collar 37, and at the top by a collar 38 working around the ends of the respective shafts 3 and 4. The collars 38 are attached to sleeves 15 which are carried upward through the top of the frame 1 and have laterally projecting arms 14. These arms are connected by a pin or otherwise to a rod 13 preferably provided with a right and left hand screw coupling 39 for purposes of adjustment. This rod 13 is connected to the end of an arm 12 attached to a shaft 40 carried in brackets 41 on the top of the frame 1. The shaft 40 also has an arm 11 fixed to it which arm engages in the usual way with a collar 10 forming part of the governor 31. The collar 10 of course rises in the usual way owing to the action of the governor when the speed increases, and falls again as the speed falls. The outer end of the rod 13 is preferably guided in a plate 17 as shown, attached to the front of the frame.

23 is a lever pivoted at 26 and connected by the rod 27 to the usual trip mechanism by means of which the steam supply to the winding engine is cut off and the brakes are applied in case of a steam winding engine, or the current is cut off and the brakes applied in the case of electric winding. This mechanism is not illustrated as it forms no part of the present invention and is well understood. The lever 23 and the rod 27, owing to their connection with this trip mechanism, will be pulled in a direction tending to move them toward the left in Fig. 2 for the purpose of stopping the winding. A projection 22 on the lever 23 is engaged by the catch-shaped end of an arm 21 serving to prevent the trip mechanism above referred to from coming into action under normal circumstances. The arm 21 is mounted on a shaft 19 and is held up in its engaging position by means of a spring 20. The shaft 19 carries projecting arms 18 which rest on the tops of the collars 38 connected to the ratchet plates 8 and 9. Hence when one of these ratchet plates is raised in any way one pair of the arms 18 will be positively raised turning the shaft 19 and turning downward the arm 21 until the catch 22 is released and the shaft 23 is allowed to move toward the left under the action of the trip mechanism above referred to.

Each of the plates 8 and 9 is formed with a slot as indicated at 42, plates 25 being provided with projections passing through the said slots 42 and adapted to be clamped in various positions on the plates 8 and 9, within the limits of longitudinal movement permitted by the slots. Each of the plates 25 carries an adjustable catch or projection 24 which may be of similar form to the ratchet teeth of the plates 8 and 9, but will project beyond these latter as indicated.

Indicator arms 47, pivoted at 48, and working over arc-shaped projections 49 of the main frame, are normally held in the positions shown by the action of springs 50 holding them against stops 51. The tail pieces 52 of the arms 47 are in the path of the projections 46 on the nuts 6 and 7 as they near the top of their travel on the screws 3, 4.

The operation of the device will be obvious with very little further explanation. At the starting of the winding in either direction the nuts 6 and 7 will be at the top and bottom respectively of their screwed shafts 3 and 4 or vice versa. If the winding is started in the wrong direction the nut which is at the top will immediately strike against and lift the collar 38 of its notched plate, causing the trip mechanism to be operated through arms 18 as before mentioned. If the winding is started in the right direction, the nut which is at the top will commence to travel downward while the other nut will travel upward. The rearward projections 35 of the nuts work in slots 45 in the frame 1 which slots are wider than the projections 35 so as to allow a certain amount of angular movement to each nut as before mentioned. The shafts 3 and 4 both turn in the same direction although one is threaded right handedly and the other left handedly. Hence when the two shafts 3 and 4 begin to turn in one direction, after the end of a wind during which they have turned in the reverse direction, both the nuts 6 and 7 will turn through a small angle corresponding to the movement of their rear projections 35 within the limits of the slots in the frame 1. This slight amount of turning movement is sufficient to throw the forward projection 36 of the nut which is at the topmost position outwardly away from its ratchet plate, while the corresponding projection on the other nut is thrown inwardly toward its ratchet plate. This state of affairs continues as long as the motion in the same direction continues so that it will always be the rising nut which tends first to contact with and engage the teeth of its ratchet plate. As the speed of winding increases, the ratchet plates are turned so as to move outwardly, that is to say they turn more toward the projections 36 on the nuts, owing to the connection before mentioned with the governor 31. If the speed becomes excessive at any time during the winding the projection 36 on the rising nut will thus engage with the teeth of its ratchet plate, so lifting the plate and causing the trip mechanism to be operated as before described. If the speed is not reduced sufficiently toward the end of the wind engagement will take place with the adjustable projection 24 serving the same purpose. The only object of having this projection adjustable is to enable the reduction of speed at the end of the wind to be determined or varied as required according to particular circumstances. If that is not necessary a member permanently attached to or forming part of each plate 8 and 9 may be used serving the same purpose.

During the winding the nuts 6 and 7 themselves serve as indicators to show the positions of the lift cages. Just at the end of the winding the rising nut strikes by its projection 46 against the short tail piece 52 of the arm 47, causing the pointed end of said arm to turn over the scale on the plate 49, and so to indicate on an increased scale the movements just at the end of the wind.

Finally it will be evident that various modifications in details of construction of the device may be made and parts may be replaced by their mechanical equivalents without departing from the scope of the invention.

I declare that what I claim is:—

1. In a controlling apparatus for use in connection with winding machinery, the combination of a pair of screw threaded shafts and means for driving the same from the winding machinery, a pair of ratchet plates and collars supporting the same in such manner that the ratchet plates can turn in an arc around the said shafts, nuts working on the screw threads, faces on the nuts adapted to engage with the ratchet plates, a governor and means for driving the same at a speed proportional to the speed of winding, connecting mechanism between the governor and the ratchet plates whereby the said ratchet plates are turned by the movements of the governor, and a releasing mechanism adapted to be actuated by longitudinal movement of the ratchet plates.

2. In a controlling apparatus for use in connection with winding machinery, the combination of a pair of screw threaded shafts and means for driving the same from the winding machinery, a pair of ratchet plates and collars supporting the same in such manner that the ratchet plates can turn in an arc around the said shafts, nuts working on the screw threads, projections on each nut and a slotted guiding member having slots wider than the projections which engage therein so as to allow each nut to turn through a small angle, faces on the nuts adapted to engage with the ratchet plates, a governor and means for driving the same at a speed proportional to the speed of winding, connecting mechanism between the governor and the ratchet plates whereby the said ratchet plates are turned by the movements of the governor, and a releasing mechanism adapted to be actuated by longitudinal movement of the ratchet plates.

3. In a controlling mechanism for winding machinery, the combination of a pair of screw threaded shafts with nuts working thereon, the one shaft and nut being threaded right handedly and the other shaft and nut threaded left handedly, a governor and means for driving the governor and the two screw threaded shafts simultaneously from the winding machinery, members extending longitudinally of the shafts, connecting means between the governor and the said members adapted to produce movements of said members as the governor rises and falls with variation of speed, engaging means on the nuts adapted to co-act with and engage the members extending longitudinally of the shafts when the said members are moved to a certain extent, guiding means for the nuts adapted to permit a small amount of free angular movement thereof, and a releasing mechanism adapted to be actuated by the longitudinal movement of either of the engaging members.

4. In a controlling mechanism for winding machinery, the combination of a pair of screwed shafts with nuts working thereon, a governor, a pair of engaging members extending longitudinally adjacent to the screwed shafts, means connecting the governor operatively with said engaging members, means for driving the screwed shafts and the governor from the winding machinery, adjustable stops with means for clamping them on the longitudinal engaging members, said stops and engaging members on the one hand and the pair of nuts on the other hand being formed in such a manner that they will engage with one another when brought into contact by the action of the governor, and a releasing mechanism adapted to be actuated by the longitudinal movement of one of the engaging members.

5. In a controlling mechanism for winding machinery, the combination of a screw threaded shaft, a nut working thereon, means for guiding said nut in such manner that it is moved longitudinally by the rotation of the shaft, a plate extending longitudinally adjacent to the screwed shaft, collars supporting the plate, said collars being adjacent to the ends of the screwed shaft, a governor device and means connecting the same to the said plate, means for driving the governor and the screwed shaft from the winding machinery, engaging faces on the nut and plate respectively adapted to co-act when the plate is moved to a certain extent in one direction by the action of the governor, and a releasing device adapted to be actuated by the longitudinal movement of the plate due to the engagement either of the nut with the plate or of the nut with one of the collars at the ends of the plate.

In witness whereof, I have hereunto signed my name this 8th day of March, 1912, in the presence of two subscribing witnesses.

JOSEPH BARRACLOUGH GOTT.

Witnesses:
T. S. SHILLINGTON,
HUBERT A. GILL.

---

Copies of this patent may be obtained for five cents each, by addressing the "Commissioner of Patents, Washington, D. C."